United States Patent [19]

Marazzi et al.

[11] Patent Number: 5,330,939
[45] Date of Patent: Jul. 19, 1994

[54] METHOD OF PREPARING VITREOUS CERAMIC COMPOSITION SUITABLE FOR COATING CERAMIC ARTICLES

[75] Inventors: Filippo Marazzi, Sassuolo; Mariano Paganelli, Modena, both of Italy

[73] Assignee: Ceramica Filippo Marazzi S.p.A., Bologna, Italy

[21] Appl. No.: 156,799

[22] Filed: Nov. 23, 1993

Related U.S. Application Data

[60] Continuation of Ser. No. 921,997, Aug. 4, 1992, abandoned, which is a division of Ser. No. 662,831, Mar. 1, 1991, abandoned.

Foreign Application Priority Data

Mar. 9, 1990 [IT] Italy ............... 19641 A/90

[51] Int. Cl.$^5$ .................. C03C 1/00; C03C 14/00
[52] U.S. Cl. ........................ 501/32; 501/10; 501/14; 501/21; 501/26; 501/67; 501/68; 501/70; 501/77
[58] Field of Search ............ 501/10, 14, 21, 26, 501/32, 67, 68, 70, 77

[56] References Cited

U.S. PATENT DOCUMENTS

| | | | |
|---|---|---|---|
| 913,036 | 2/1909 | Nelson . | |
| 1,183,389 | 5/1916 | MacLean . | |
| 2,920,971 | 1/1950 | Stookey | 501/10 |
| 3,460,987 | 8/1969 | McMillan et al. | 501/70 |
| 3,681,097 | 8/1972 | Beall et al. | 501/4 |
| 3,681,102 | 8/1972 | Beall | 501/69 |
| 3,839,053 | 10/1974 | Rittler | 106/39.6 |
| 3,854,963 | 12/1974 | Rittler | 106/39.6 |
| 3,951,669 | 4/1976 | Malmendier et al. | 501/10 |
| 4,199,340 | 4/1980 | Topping et al. | 65/32 |
| 4,526,873 | 7/1985 | Beall et al. | 501/5 |
| 4,687,750 | 8/1987 | Pinckney | 501/10 |
| 4,805,551 | 2/1989 | Marazzi | 118/69 |
| 4,940,674 | 7/1990 | Beall et al. | 501/4 |
| 5,001,086 | 3/1991 | Carrier et al. | 501/9 |
| 5,028,567 | 7/1991 | Gotoh et al. | 501/10 |

FOREIGN PATENT DOCUMENTS 1496496 9/1967 France .
913836 11/1970 Italy .

*Primary Examiner*—Helene Klemanski
*Assistant Examiner*—M. Marcheschi
*Attorney, Agent, or Firm*—Jacobson, Price, Holman & Stern

[57] ABSTRACT

A vitreous ceramic composition for coating ceramic articles with a zinc and alumina base capable of separating rapidly up to 50% of crystalline phase consisting essentially of gahnite. The percentages by weight of the principal ingredients of the composition are the following. $SiO_2$ 30–50%; $Al_2O_3$ 10–25%; ZnO 8–25%; $B_2O_3$ 5–20%; $TiO_2$ 0–7%; other selected oxides can be added to change the fusability characteristics and heat expansion coefficients on the basis of specific applications of the composition.

8 Claims, No Drawings

METHOD OF PREPARING VITREOUS CERAMIC COMPOSITION SUITABLE FOR COATING CERAMIC ARTICLES

This is a continuation of application Ser. No. 07/921,997, filed Aug. 4, 1992 which was abandoned upon the filing hereof; which in turn was a divisional of application Ser. No. 07/662,831, filed Mar. 1, 1991, now abandoned.

BACKGROUND OF THE INVENTION

The coating of ceramic articles with glass ceramic materials has been a known industrial practice for a long time, and has already been described in previous patents, for example Italian Patent No. 913,836 to the applicant Marazzi.

To obtain a coating usable with ceramics, or to give rise to the crystallization of polycrystalline phases starting from a vitreous matrix, it is necessary that the composition be carefully studied so as to favor crystallization of the desired phases.

For example compositions rich in zinc have been used for a long time, to obtain coatings for ceramic articles. In these compositions the crystalline phases which are formed during devitrification are always made up of zinc silicates, for example Willemite.

Glass ceramic materials assimilable with this family are known, for example as described in U.S. Pat. Nos. 2,920,971, 3,460,987, 3,681,097, 3,681,102, 3,839,053, 3,854,963, 3,951,669, 4,199,340, 4,526,873, 4,687,750 and French Patent No. 1,496,496.

SUMMARY OF THE INVENTION

It is an object of the present invention to provide a vitreous ceramic composition based on zinc and alumina capable of separating rapidly up to 50% of crystalline phase, displaying excellent acid resistance and wear, and whose softening temperature is ideal for most common heat cycles. It is known in particular that in the single firing cycles, the softening temperature of the glaze must be higher than the degassing temperature of the support.

Yet another object of the invention is to obtain such a composition which is suitable for wet or dry glazing, readily colorable and with a linear heat expansion coefficient which can be changed to adapt it to commonly used ceramic supports, in particular for the molding of tiles.

DETAIL DESCRIPTION OF THE PREFERRED EMBODIMENTS

To achieve these and other objects which will be more fully clarified by the following description, the invention provides a vitreous ceramic composition characterized in that it comprises the following ingredients in the indicated percentages, expressed as weight percent:

| | |
|---|---|
| $SiO_2$ | 30-50% |
| $Al_2O_3$ | 10-25% |
| ZnO | 8-25% |
| $B_2O_3$ | 5-20% |
| $TiO_2$ | 0-7% |

In the composition other accessorial elements may be present, up to a maximum of 5% by weight of the composition, with the following limitations:

the aggregate of oxides of the $M_2O$ family ($Li_2O$, $Na_2O$, $K_2O$, $Rb_2O$, $Cs_2O$) must not exceed 8% by weight of the composition;

the aggregate of the oxides of the MO family (MgO, CaO, SrO, BaO, PbO) must not exceed 5% by weight of the composition.

These oxides can be selected in such a manner as to change the fusability and expansion coefficient characteristics based on the specific applications.

The composition based on zinc and alumina, in accordance with the invention, proved to be capable of separating up to 50% of the crystalline phase consisting essentially of gahnite (zinc aluminate). It was also found that such a composition provides for a very high devitrification speed which renders it suitable for use in most modern production technologies for glazed ceramic articles, in particular tiles. The firing speed of the articles has increased continuously with progress in the technology and the latest technological developments, such as for example the cycle which calls for direct deposit of the composition on an incandescent ceramic support (the object of U.S. Pat. No. 4,805,551 corresponding to Italian Patent No. 1,183,389), require vitreous compositions capable of devitrifying in extremely short times on the order of a few minutes.

The compositions, in accordance with the present invention, proved to be suitable for optimization of the basic parameters for the industrial application; in particular:

a) the linear heat expansion coefficient can be readily modified so as to adapt perfectly to the ceramic supports used in normal industrial practice, in particular for tiles;

b) acid resistance is excellent, contrary to that which is notoriously characteristic of zinc-based glazes where it crystallizes predominately Willemite (zinc silicate). Gahnite is classified among the acid-insoluble materials (CRC Handbook of Chemistry and Physics) whereas Willemite is readily soluble;

c) wear resistance is clearly improved in relation to known zinc-based compositions, because the Gahnite, thanks to its high hardness of 7.5-8 on the Mohs scale, gives the ceramic coating high resistance, contrary to Willemite which has a hardness of 5.5 (CRC Handbook of Chemistry and Physics);

d) the softening temperature obtainable with the compositions in accordance with the present invention are ideal for the more common heat cycles and in particular single heat cycles;

e) crystallization speed is sufficiently high to permit complete devitrification in a few minutes, therefore these compositions are suitable for application in the technological cycle with direct application on an incandescent support.

The composition can be prepared in accordance with known industrial practices, i.e. mixing suitable raw materials, then bringing them to melting in a suitable smelting furnace and suddenly cooling the vitreous mass in water (this operation is known as "fritting").

The vitreous compound thus obtained can be applied on the support in accordance with known industrial technologies:

a) wet glazing, in the form of a suspension in water applied on baked supports (biscuit), or raw (single fired);

b) dry glazing by single pressing or application in the form of powder or grit on baked, raw or incandescent support.

The crystalline phase which separates during the firing cycle (Gahnite) leads to total dulling. The surface obtained may be either bright or matt (opaque) depending on the size of the crystals obtained by appropriately selecting the heat cycle and the composition.

The residual vitreous phase is readily colorable by known techniques.

To obtain the above mentioned characteristics none of the vitreous ceramics compositions heretofore proposed or known in industrial practice offered satisfactory results. But now it has been surprisingly found that the composition in accordance with the invention achieves all the proposed objects and displays singularly favorable characteristics.

The great elasticity in the composition, in particular the possibility of adding oxides up to 5% by weight, is a new and very important fact because it permits optimization of the characteristics of the product as regards all factors. For example, it permits adaptation of the expansion coefficient, changing the quantity of alkalis, or lowering the surface tension of the vitreous phase, introducing small percentages of lead. In the majority of known compositions it is necessary to exercise great care not to introduce harmful elements which would disturb the devitrification process or the characteristics of the ceramic product would be changed.

The composition in accordance with the present invention is very flexible and permits a broad range of effects which range from completely bright glaze to matt, just by utilizing in a positive manner the sensitivity to the variations of composition.

For example, the size of the crystals can be effectively controlled by varying the percentage of titanium, which shows a very energetic nucleating activity. Even with substantial percentages of titanium dioxide the ceramic product is perfectly white while the majority of the conventional compositions take on an unpleasant yellow color.

It is possible to use other classical nucleators such as zirconium and tin, but due to their reduced solubility in glass the melting operations prove to be more difficult and their higher cost makes them uneconomical to use. Since titanium does not interfere with coloration, behaves very well as a nucleator, and favors melting operations by reducing the viscosity of the melted glass, it is the best choice. In the absence of nucleators the devitrification process takes place in a less diffuse manner in the mass and is influenced mainly by the size of the grains. In this manner there is obtained a smaller number of crystals which then grow to larger size, even disturbing the surface of the glass and thus creating a matt effect. This particular aesthetic effect can then be controlled by introducing, in the composition of the glass, small percentages of oxides which reduce the surface tension so as to favor both crystal growth and emergence from the surface of the residual vitreous phase.

The ability of introducing a large variety of accessorial elements also permits adaptation of the compositions to the most varied firing cycles, since it is possible to obtain, in the indicated field of compositions, products with firing temperatures varying between 1000° C. and 1200° C.

At lower temperatures there is obtained only partial sinterization of the glass grains with formation of metastable phases. Starting from 1000° C. however the crystalline phase which separates is made up essentially of gahnite which, in this range of temperatures, is the compound most dynamically favored.

Over 1200° C. it is possible to encounter a partial solution heat-treatment of the crystalline phase which begin to be formed starting at 1000° C. with the consequent excessive growth of a few crystalline nuclei. In conclusion, the product loses opaqueness and takes on a poor appearance.

In any case the temperature range in which these compositions can be used includes the larger part of the firing cycles of glazed ceramic articles. As concerns the duration of the firing cycle it has already been pointed out that these compositions are characterized by high crystallization speed, thereby adapting well to the fastest cycles also.

If the firing cycles are slower there are no problems because once complete devitrification has been achieved the product remains stable over a vast range of temperatures and times.

There are now described below nonlimiting examples of the ceramic composition in accordance with the invention.

EXAMPLE 1

Veneer tiles, size 20×25 cm, with porous single-firing.

The following composition was used:

| $SiO_2$ | 35.3% | $B_2O_3$ | 14.4% | $Al_2O_3$ | 21.6% |
|---|---|---|---|---|---|
| CaO | 1.2% | MgO | 2.7% | ZnO | 17.2% |
| $K_2O$ | 3.2% | $Na_2O$ | 2.2% | $TiO_2$ | 2.3% |

The mixture of suitable raw materials was melted in a tank furnace at 1450° C. and suddenly cooled in water.

The frit thus obtained is perfectly transparent and the glass appeared amorphous upon diffractometer analysis with X-rays.

The frit was then ground wet with the addition to each 100 g of dry material of 75 g of water, 5 g of bentonite, 0.3 g of carboxymethylcellulose and 0.2 g of sodium tripolyphosphate as suspension and fluidizing agents. The barbotine enamel thus obtained was applied to raw 20×25 cm size pieces previously coated with a layer of engobe in accordance with known industrial practice. The quantity of glaze applied was 40 g of suspension for each piece, which corresponds to 8 g/dm².

The raw glazed pieces are appropriately dried and then introduced in a one-layer kiln with rollers of the SM SITI type.

The firing cycle had a duration of 45 min with a maximum temperature of 1060° C. and holding at the maximum temperature for 5 min.

The fired pieces displayed an orange peel surface, pleasantly bright and decidedly white and defect-free. Diffractometer analysis with X-rays reveals that the crystalline phase formed represents 40% of the mass and consists of Gahnite.

The linear heat expansion coefficient in the range 25° to 300° C. was $5.64 \times 10^{-6}$.

The incipient melting temperature measured with a Leitz heating microscope was 1000° C. hence suitable for single-firing porous glazes.

Acid resistance was excellent. The product is classified AA by the EN 122 test.

EXAMPLE 2

Grés floor tiles, size 30×30 cm, obtained by single firing.
The following composition was used:

| SiO$_2$ | 40.4% | B$_2$O$_3$ | 15.0% | Al$_2$O$_3$ | 17.5% |
|---|---|---|---|---|---|
| MgO | 2.9% | ZnO | 13.9% | K$_2$O | 2.7% |
| Na$_2$O | 1.8% | TiO$_2$ | 5.7% | | |

The frit and glaze were prepared as described in the previous example. The glaze was then applied on the raw, size 30×30 cm pieces previously coated with engobe in accordance with known industrial practice.

The quantity of glaze applied was 72 g of suspension for each piece, corresponding to 8 g/dm$^2$.

The raw glazed pieces were appropriately dried and then introduced in a single-layer roller kiln of the SITI SM type. The firing cycle was 60 min with a maximum temperature of 1130° C. held for 5 min.

The fired pieces display a smooth bright white surface. Diffractometer analysis with X-rays reveals that the crystalline phase formed represents 30% of the mass and consists of Gahnite.

The linear heat expansion coefficient in the range 25° to 300° C. was $5.45 \times 10^{-6}$.

The incipient melting temperature measured with a Leitz heating microscope was 1020° C.

Acid and base resistance measured in accordance with the EN 122 method was excellent. The product is not etched and is therefore classifiable as AA.

Abrasion resistance measured in accordance with the PEI method gave a weight loss of 0.8500 g after 25000 revolutions while, after 6000 revolutions (as called for in EN standard 154) weight loss was only 0,0720 g. (Tiles with conventional glazes give values two or three times higher).

EXAMPLE 3

Grés flooring tiles, size 30×30 cm, with direct deposit of the composition on the incandescent support.
The following composition was used:

| SiO$_2$ | 33.7% | B$_2$O$_3$ | 14.6% | Al$_2$O$_3$ | 22.7% |
|---|---|---|---|---|---|
| MgO | 2.8% | ZnO | 18.9% | K2O | 2.6% |
| Na$_2$O | 1.7% | TiO$_2$ | 3.9% | | |

The frit was prepared as described in examples 1 and 2 but, instead of wet grinding, it was subjected to dry grinding using a steel roller mill.

The ground frit was deferrized and sifted to eliminate grains larger than 770 microns.

Grain size was within the following limits expressed in microns:

| high6300 | high500 | high400 | high315 | high250 | high200 | high125 | low125 |
|---|---|---|---|---|---|---|---|
| 0–0.5 | 9–12 | 25–28 | 21–24 | 10–15 | 9–11 | 9–11 | 5–7 |

The product thus prepared was applied on a sintered ceramic support in an incandescent state in accordance with known technology in an FS SITI industrial kiln.

The quantity applied was 200 g for each size 30×30 cm piece. Holding in the glaze firing and crystallization section was for 7 min at 1090° C.

The surface of the fired tiles was pleasantly undulated and bright and ice white in color.

Diffractometer analysis with X-rays reveals that the crystalline phase consists essentially of Gahnite. The heat expansion coefficient in the range 25° to 300° C. was $5-64 \times 10^{-6}$.

The incipient melting temperature measured with the Leitz heating microscope was 1000° C.

Acid and base resistance measured in accordance with EN standard 122 was excellent. The product is not etched and hence is classifiable as AA.

Abrasion resistance measured in accordance with the PEI method gave a weight loss of 0.5710 after 25000 revolutions.

Abrasion resistance measured by the Capon method (EN standard 102 for unglazed products) gave a loss by volume of 125 mm$^3$ after 150 revolutions. It should be noted that the limit for unglazed products was set at 205 mm$^3$.

The value measured on this glazed tile therefore would allow exceeding the test limits required for unglazed products.

EXAMPLE 4

Veneer tiles, size 20×25 cm, in fast double firing.
The following composition was used:

| SiO$_2$ | 36.5% | B$_2$O$_3$ | 14.9% | Al$_2$O$_3$ | 22.4% |
|---|---|---|---|---|---|
| CaO | 1.2% | MgO | 2.8% | ZnO | 17.8% |
| K$_2$O | 2.7% | NaO | 1.8% | TiO$_2$ | 0.0% |

The frit and glaze were prepared as describe above for Example 1.

The glaze slip was applied on porous engobed biscuit in accordance with known industrial practice in the amount of 40 g per piece.

The appropriately dried pieces were fired in a single-layer roller oven of the SITI SM type. The firing cycle was 45 min with a maximum temperature of 1060° C. The fired pieces exhibit a bright surface and are decidedly white.

The linear heat expansion coefficient in the range 25° to 300° C. was $4.36 \times 10^{-6}$.

Softening temperature was 840° C.

We claim:

1. A method of preparing frits, useful in the coating of ceramic pieces, consisting of the steps of:
    - preparing a vitreous ceramic composition by mixing the following ingredients expressed in weight percent to form a mixture thereof:

| SiO$_2$ | 30–50% |
|---|---|
| Al$_2$O$_3$ | 10–25% |
| ZnO | 8–25% |
| B$_2$O$_3$ | 5–20%; and |
| TiO$_2$ | 0–7%; | heating said mixture to a temperature at least sufficient for melting said composition to produce a vitreous mass which will separate rapidly up to 50% of the crystalline phase made up essentially of gahnite; and suddenly cooling said vitreous mass.

2. The method as claimed in claim 1, and further comprising:
adding to said mixture forming said vitreous ceramic composition further oxides of elements selected from the group consisting of Li, Na, K, Rb, Cs, Mg, Ca, Sr, Ba, Pb and mixtures thereof.

3. The method as claimed in claim 2, and further comprising:
adding said further oxides according to the formula $$M_2O$$

where M is an element selected from the group consisting of Li, Na, K, Rb and Cs and does not exceed 8 weight percent of the composition.

4. The method as claimed in claim 3, and further comprising:
adding said further oxides according to the formula $$MO$$

where M is an element selected from the group consisting of Mg, Ca, Sr, Ba and Pb and does not exceed 5 weight percent of the composition.

5. The method as claimed in claim 1, wherein said temperature for melting said composition is approximately 1,450° C.

6. The method as claimed in claim 1, wherein said temperature for melting said composition is approximately 1,450° C.

7. The method as claimed in claim 3, wherein said temperature for melting said composition is approximately 1,450° C.

8. The method as claimed in claim 4, wherein said temperature for melting said composition is approximately 1,450° C.

* * * * *